April 17, 1934.     R. G. WHITLOCK     1,954,906
REGISTER FOR LIQUIDS
Filed March 7, 1933     4 Sheets-Sheet 1
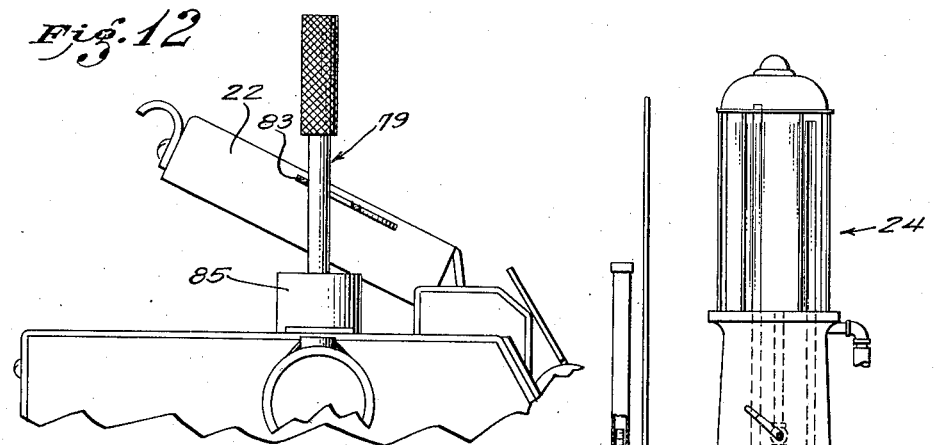
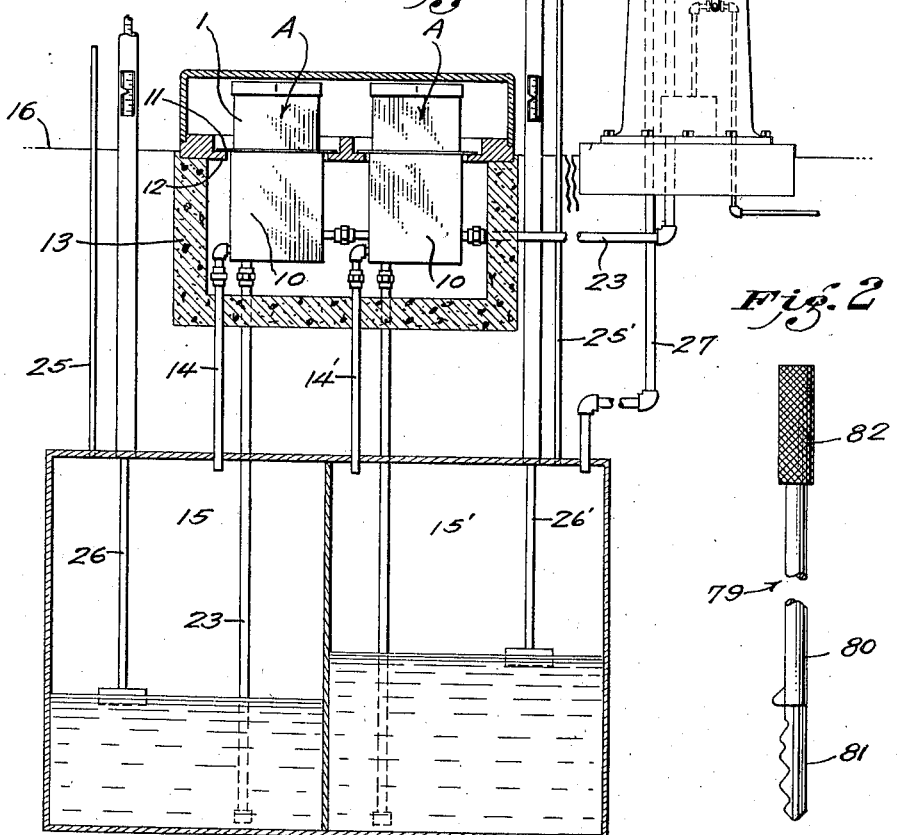
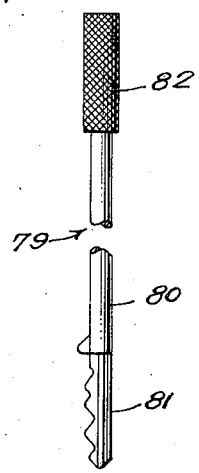
INVENTOR
Ralph G. Whitlock
BY
Larrabee
his ATTORNEY April 17, 1934.  R. G. WHITLOCK  1,954,906
REGISTER FOR LIQUIDS
Filed March 7, 1933  4 Sheets-Sheet 2
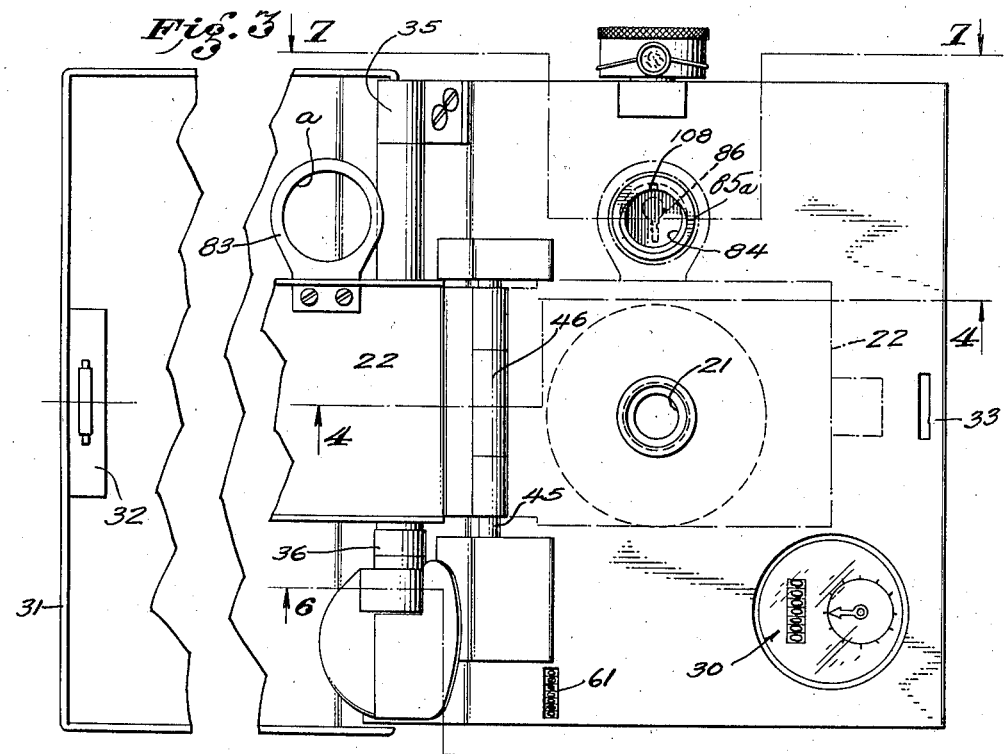
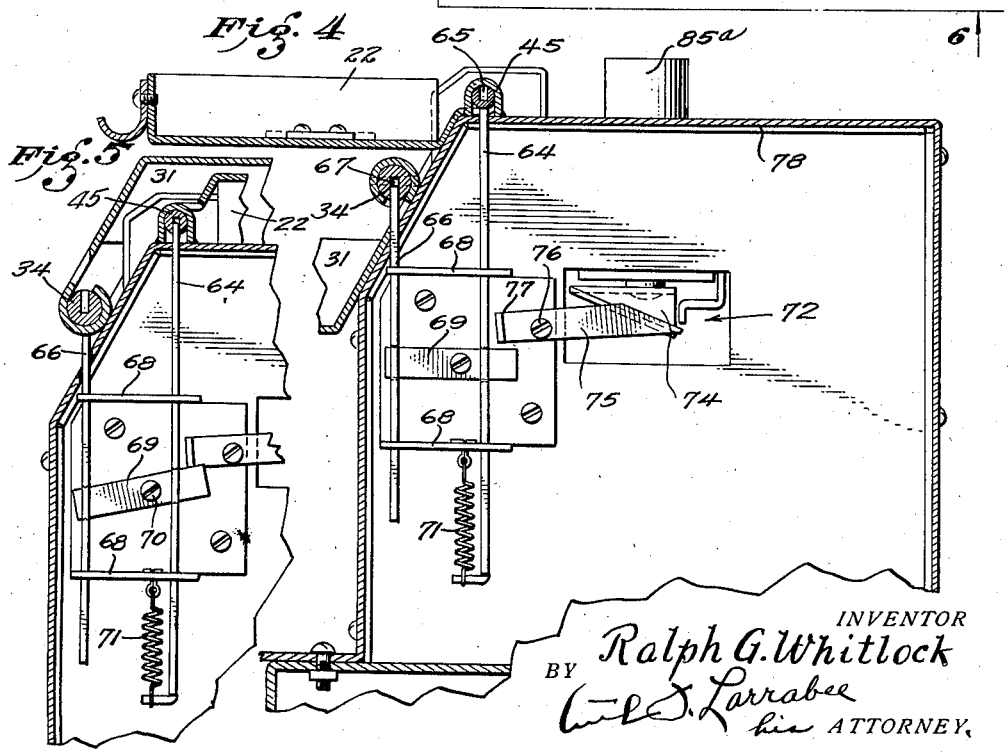
INVENTOR
Ralph G. Whitlock
BY Carl J. Larrabee
his ATTORNEY April 17, 1934.  R. G. WHITLOCK  1,954,906
REGISTER FOR LIQUIDS
Filed March 7, 1933   4 Sheets-Sheet 3

INVENTOR
Ralph G. Whitlock
BY
Larrabee
his ATTORNEY

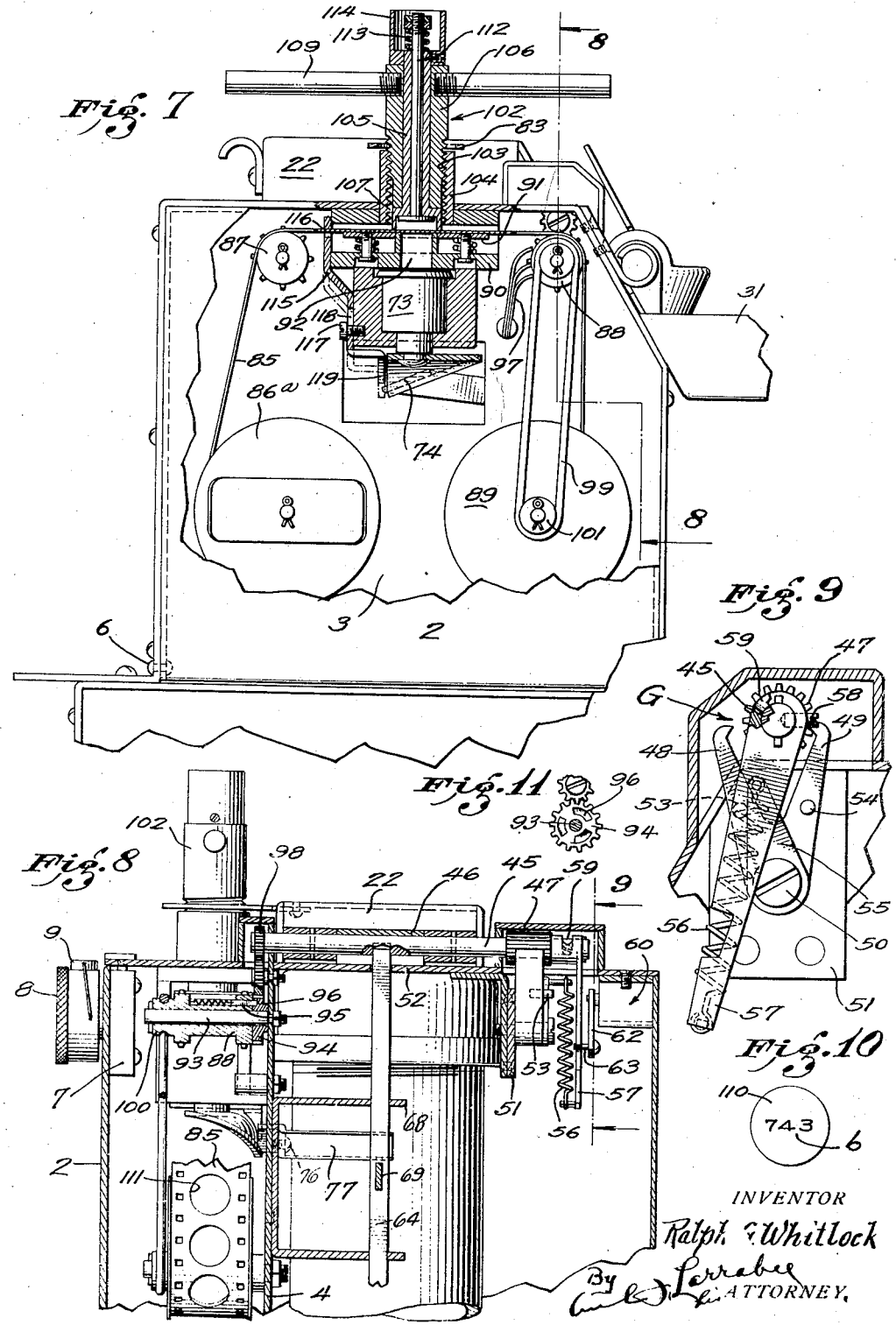

Patented Apr. 17, 1934

1,954,906

UNITED STATES PATENT OFFICE 1,954,906

REGISTER FOR LIQUIDS

Ralph G. Whitlock, Los Angeles, Calif., assignor, by mesne assignments, to Federal Foundation, Inc., Las Vegas, Nev., a corporation of Nevada Application March 7, 1933, Serial No. 659,979

38 Claims. (Cl. 221—100)

This invention pertains to registers for containers, and more particularly to a register for use in conjunction with liquids, particularly liquid fuel and the like and is particularly adapted to be associated with the storage tanks for liquid fuel such as are found in use in gasoline service stations.

An object of my invention is to provide a novel and simple device whereby the supply line to a container for liquids must be locked when not in use, and whereby the liquid supplied to said container may be measured and recorded, both as to the quantity of liquid delivered to said container as well as to indicate the number of times that the inlet to the container is opened.

An object is to provide a novel device whereby a shield is automatically passed over the keyhole of a lock controlling the closure for a storage tank inlet, so that an opening must be cut out of said shield before the device may be opened to permit liquids to be delivered to the container through said inlet with which said device is associated, and which portion so cut out of said shield will provide a token which may be delivered to an auditing department.

Another object is to provide a novel and simple device that is associated with the inlet of a container for liquids and through which device all liquid delivered to such container must pass so that an accurate register of the liquid delivered to said container and the number of times liquid has been so delivered may be kept.

Another object is to provide a novel device that is interposed between a storage container for liquids and the inlet which delivers liquid to replenish the supply in said container whereby the quantity of liquid delivered to said storage container will be automatically measured and registered.

Another object of the invention is to provide in conjunction with locking means for the inlet end of containers, novel means whereby such locking means is automatically sealed by the operation of means permitting access to such inlet end and which novel means requires a record to be left that such locking means has been made accessible for unlocking purposes.

A still further object is to provide novel means whereby when the inlet pipe of a container for liquids is made accessible for filling purposes the delivery pipe from said container is automatically closed.

A still further object is to provide novel means whereby when the register is closed the lock associated with the inlet of a storage tank is automatically sealed so that such lock will not be accessible without breaking such seal, thereby insuring a record of the number of times that the inlet to said storage tank is made accessible.

A still further object is to provide a novel register for liquids whereby the inlet to storage tanks is closed and a dual record is recorded of the number of times said inlet is made accessible.

A still further object is to provide novel means whereby access to a lock that controls admission to the delivery end of a storage tank may be guarded by a shield that must be perforated before said lock may be made accessible, and whereby when said shield is exhausted, admission to such delivery end automatically prevented until said shield is replenished.

A still further object is to provide novel means associated with a cover adapted to open and close the inlet of a storage tank so that upon movement of said cover it may be moved only in one direction until the cover reaches the limit of its movement in either an open or closing operation.

The invention resides in the parts and combinations of parts more particularly hereinafter set forth and described in detail in the accompanying specification, as well as in the method of registering and recording the amount of liquid delivered through the device, as well as the registering and recording of the number of times the device has been made accessible to permit liquid to be passed therethrough.

This application is an improvement over my co-pending application for U. S. Letters Patent, Serial No. 594,804, filed February 24, 1932, on Liquid storage and dispensing system.

Other objects, advantages and features of invention may appear from the accompanying drawings, the subjoined detailed description, and the appended claims.

The accompanying drawings illustrate my invention in the form I at present deem preferable.

Figure 1 is a side elevation of registers for liquids constructed in accordance with my invention and associated with storage tanks and a pump for dispensing liquids from said tanks. The pump is shown in side elevation, the storage tanks and housing for the register for liquids being shown in section. Parts are broken away to contract the view and to disclose parts otherwise hidden.

Fig. 2 is a side elevational view of a key used for unlocking the cover that closes the inlet end of a storage tank associated with my device.

Fig. 3 is a plan view of the device showing the covers in open positions. Parts are broken away to contract the view and the cover for the inlet to the storage tank is shown in closed position by dot and dash lines.

Fig. 4 is a fragmental sectional view taken on irregular line 4—4, Fig. 3. The covers are in open position and portions are broken away to contract the view.

Fig. 5 is a fragmental view analogous to Fig. 4, but showing the covers in closed position.

Fig. 7 is a fragmental view partly in section and partly in elevation taken on irregular line 7—7, Fig. 3, but with a seal punching die in place to open the seal to the storage tank inlet cover lock.

Fig. 8 is a view taken on irregular line 8—8, Fig. 7.

Fig. 9 is a fragmental view partly in section and partly in elevation taken on line 9—9, Fig. 8.

Fig. 10 is a plan elevation of a token cut out and removed from the lock shielding means.

Fig. 11 is a side view of the gear drive for the lock shielding means.

Fig. 12 is a fragmental side elevational view of the housing with the outer cover fully open and the inner cover partially opened and with the key for operating the lock means for said inner cover in operating position.

Figure 6:
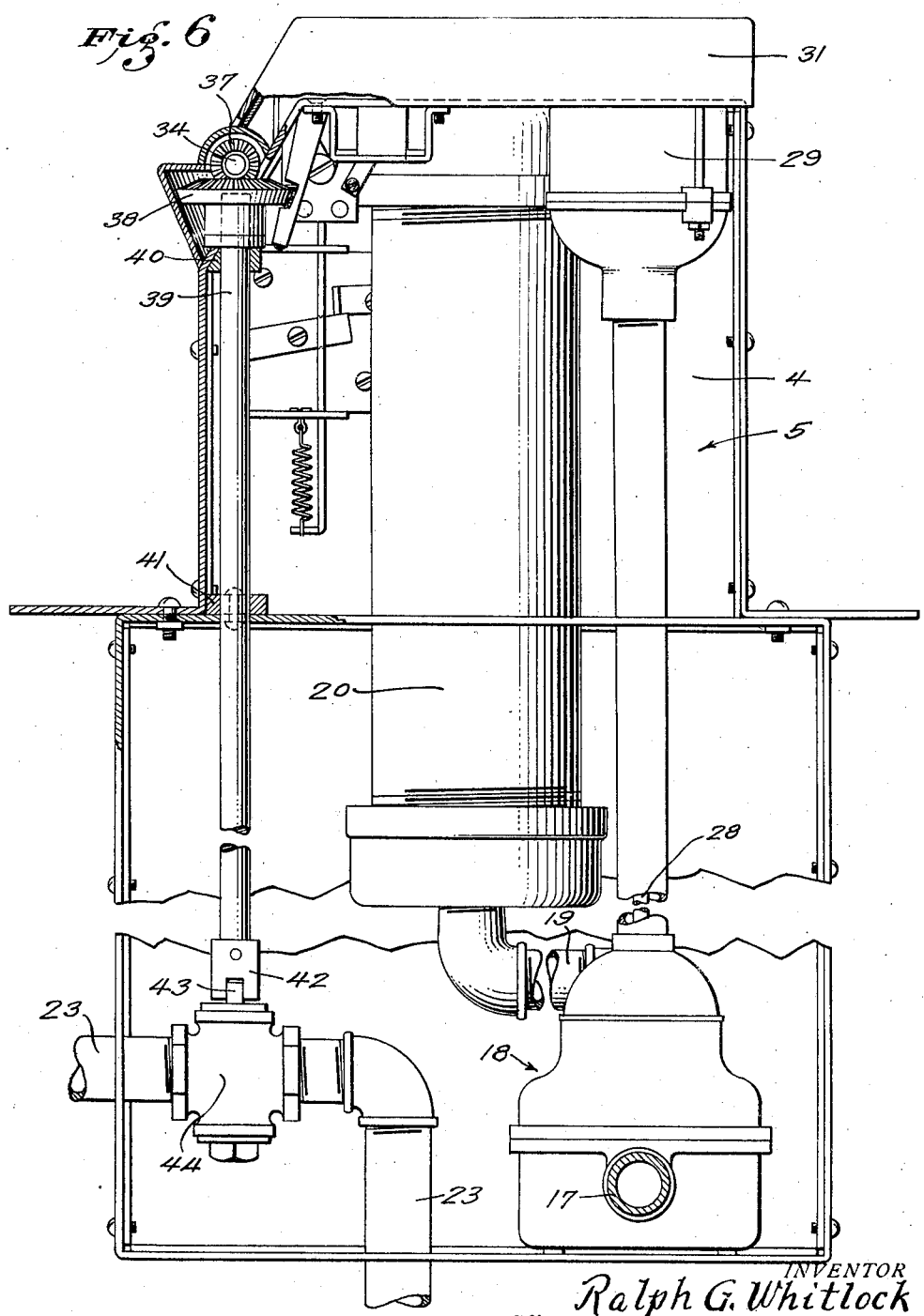
Fig. 6 is a sectional view on enlarged scale taken on irregular line 6—6, Fig. 3, showing the covers in closed position. Parts are broken away to contract the view.

Heretofore it has been customary to supply liquids such as liquid fuel to storage tanks in conjunction with gasoline stations or other points of distribution by delivering the gasoline direct from the supply truck into such tanks without any protection to the company that is supposed to supply the gasoline thereto, to prevent or prohibit the station owner from filling the storage tank with gasoline of another plant or refinery. My register for liquids is provided in conjunction with the inlet end to such a storage tank and automatically measures and maintains a record of the number of gallons of gasoline delivered through my device to the storage tank and also automatically indicates and maintains a record of the number of times the cover to the inlet of said storage tank is made accessible, and means are provided whereby dispensing of liquid from said storage tank is automatically prevented until the cover to the inlet of the storage tank is closed.

My novel register A comprises a housing 1 having a side door 2 that closes the compartment 3 which is formed by the partition wall 4, that divides the housing 1 into the compartment 3 and compartment 5. The side door 2 is hinged as at 6 and is provided with any suitable lock 7, access to which is preferably sealed by the closure member 8 having the seal 9 associated therewith.

A lower housing 10 is associated with the upper housing 1 and a supporting member 11 connected to the housings is adapted to support the device on any suitable frame work 12, associated with the pit 13 which is formed in the ground adjacent the inlets 14, 14' of the liquid storage tanks 15, 15' that are usually and preferably buried to a predetermined depth below the ground level 16.

In Fig. 1 I have shown my device associated with a dual liquid storage tank, but as the operation of my register for liquids is the same in each instance a description of one is deemed sufficient for both.

The inlet 14 of the storage tank 15 is connected to the outlet 17 of any suitable flow meter 18 and which flow meter is preferably a hydrostatic flow meter. The inlet pipe 19 to the flow meter 18 is connected to a reservoir 20 which provides and maintains a head for the flow meter so as to insure complete measuring of liquids delivered to the flow meter.

The inlet 21 to reservoir 20 is extended through the top of housing 1 and is adapted to be closed by the cover 22. Liquid from the tank 15 is adapted to be delivered through outlet pipe 23 that is connected to dispensing pump 24. The usual vent pipes 25, 25' are provided from storage tanks 15 and 15' and said tanks are respectively provided with measuring devices 26, 26'. An overflow pipe 27 leads from pump 24 to the storage tank in the customary manner.

From the foregoing it will be seen that the inlet 21, reservoir 20, inlet pipe 19, having flow meter 18 interposed therein, and inlet 14 form a conduit for liquid to the tank 15, and when it is desired to replenish the liquid in tank 15, cover 22 is opened to expose the inlet 21 and liquid from the source of supply such as a dispensing truck is admitted through inlet 21 into the reservoir 20 where it accumulates to form a head and thereby provide pressure as liquid therefrom is delivered through pipe 19 into flow meter 18 from which it flows through outlet 17 into inlet pipe 14 and into the tank 15.

The flow meter 18 is provided with a shaft 28 which is operated by flow of liquid through flow meter 18 and said shaft is connected to operate the recording means 29 and such recording means indicates at 30 the quantity of liquid passing through the flow meter 18.

The housing 1 is provided with an outer cover 31 that is provided with suitable lock means 32 adapted to engage the lock retaining plate 33 and when in closed position covers the inner or inlet cover 22.

The outer cover 31 is fixed to shaft 34 which is journalled in bearings 35, 36 and shaft 34 has secured to one end a beveled gear 37 which is in mesh with bevel gear 38 that is fixed to one end of shaft 39 which is journalled in bearings 40, 41. The other end of shaft 39 is provided with a forked connection 42, that is operatively connected to valve stem 43 of valve 44 which is interposed in the dispensing pipe 23 from tank 15.

Upon opening the outer cover 31 from the closed position shown in Fig. 6 to the open position shown in Figs. 3 and 4 the shaft 39 will be oscillated by reason of the bevel gear connection with shaft 34 so that valve 44 will be closed and thereby prevent liquid in the container from being withdrawn therefrom.

The inner cover 22 is fixed to shaft 45 that is journalled in bearing 46 so that upon opening and closing cover 22 shaft 45 will be oscillated therewith.

A ratchet mechanism G including a gear 47 is fixed to one end of shaft 45 and a pair of unitary dogs 48 and 49 in fixed relation to each other, alternately engage said gear, said dogs 48, 49 being rockably mounted on a shaft 50 formed by a shoulder screw threaded into a supporting plate 51 that depends from the top 52 of housing 1. Each dog 48 and 49 is respectively provided with a stop pin 53, 54, which are contacted by a spring supporting member 55 that is rockably mounted on shaft 50. A spring 56 is connected at one end to member 55 and at its other end to a rocking arm 57 that is rockably mounted on shaft 45. Rocking arm 57 is operated by a pin 58 that extends from and is threaded into shaft 45 and which pin 58 operates through a slotted opening 59 formed in the bearing end of rocking arm 57. The slotted opening 59 is of a predetermined length so that the pin 58 will engage the ends of said slotted opening 59 before shaft 45 has been fully oscillated by the complete opening or closing of inner cover 22.

A ratchet operated indicator mechanism 60 is connected to the housing 1 so that its indicating numerals may be visible through slot 61 and said mechanism 60 is provided with an operating arm 62 extending therefrom and which is provided with a projection 63 that is adapted to be engaged by rocking arm 57 to actuate the indicator mechanism 60.

The foregoing ratchet mechanism is connected with inner door 22 so that when the locking means for said inner door, and which will be hereinafter described, is released and the inner door 22 started on either an opening or closing movement such movement will of necessity have to be completed before said door may be moved in a reverse direction and also provides means for positively operating the indicating mechanism 60 to indicate each time the inner cover 22 has been opened to expose the inlet 21 for filling purposes.

The operation of the ratchet indicating mechanism 60 and the ratchet element G is as follows: Assuming the cover 22 to be in closed position and the shaft 45 released so that it may be operated upon opening of the cover 22 from the position shown in Fig. 7 to that shown in Figs. 3 and 4, upon moving cover 22 to open position the shaft 45 will be oscillated and upon such oscillation the dog 49 will continuously engage the teeth of gear 47 to prevent reverse movement of shaft 45 until pin 58 engages the end of slot 59 whereupon further oscillation of shaft 45 will move rocking arm 57 in a counterclockwise direction from that shown in Fig. 9 until the free end thereof has reached a position where it passes dead center with relation to the connection of spring 56 to member 55 at which time such member 55 will be moved about its pivotal point until the same engages stop pin 54 and thereby move the unitary dogs 48 and 49 on shaft 50 until dog 48 engages the teeth of gear 47 and such movement retracts the engagement of dog 49 from the teeth of gear 47. The action of spring 56 after it passes dead center as above described gives a "snap action" to the action of member 55 so that its operation is positive to insure retraction of dog 49 from gear 47 and engagement of dog 48 with gear 47. This same movement of rocking arm 57 contacts the projection 63 of operating arm 62 thereby actuating the indicator mechanism 60. A reverse movement of shaft 45 will operate the ratchet mechanism in a reverse manner and upon withdrawal of rocking arm 57 from projection 63 the operating arm 62 will be automatically returned by mechanism common to such indicator mechanism 60.

Means are provided to automatically lock the inner cover 22 when the same is moved to closed position, and to automatically lock the outer cover 31 in open position when such cover 31 is moved to open position and at the time the inner cover is unlocked to be moved from closed to open position, and to automatically release the lock that holds the outer cover 31 in open position when the inner cover 22 is moved to closed position, and such means comprise a lock bolt 64 that is adapted to be received in a recess or dwell 65 in shaft 45 and a lock bar 66 that is adapted to be received in a recess or dwell 67 in shaft 34 to which the outer cover 31 is fixed. The lock bolts 64 and 66 are slidably mounted in supports 68 that are fixed to and extend from the partition wall 4. An operating bar 69 pivoted at 70 to wall 4 cooperates with and operatively connects lock bolts 64 and 66 so that as one bolt is moved downwardly the associated bolt is moved upwardly. Suitable spring means 71 preferably connected to support 68 and lock bolt 64 tends to normally and automatically urge the lock bolt 64 into locking position and when such bolt 64 is moved to non-locking position the connecting bar 69 tends to normally urge the locking bolt 66 into locking position.

Lock controlled means 72 are provided to move locking bolt 64 to non-locking position and such means are preferably in the form of a tumbler lock 73 that is mounted in compartment 3 and has a cam 74 fixed to one end which is adapted to be rotated by operation of the lock. Cam 74 cooperates with lever 75 that is pivoted at 76 and has an extension 77 at one end thereof that engages connecting bar 69 so that upon operation of lock 73 and consequent rotation of cam 74 the lever 75 will be depressed against one end of bar 69 so as to withdraw lock bolt 64 from recess 65 and tend to force lock bolt 66 into recess 67.

The lock 73 is preferably positioned below the top 78 of housing 1 so that a special key 79 is required to operate lock 73 and to permit automatic sealing mechanism to operate between the top of lock 73 and the top 78 of housing 1. The key 79 has an elongated shank 80 to which the key proper 81 is fixed and such shank 80 is provided with a suitable handle 82.

The cover 22 is provided with guard ring 83 that is adapted, when said cover 22 is closed, to encircle the opening 84 that is formed in boss 85ª and through which opening 84 access may be had to the keyhole 86 of lock 73.

In operation of the lock means for the covers 22 and 31 it will be seen from the foregoing that with the parts in the position shown in Figs. 5 and 8 that the lock bar 66 engages the periphery of shaft 34 and is out of locking position and the lock bar 64 will be in locking engagement with the recess 65 in shaft 45. The lock 32 is then released so that cover 31 may be moved about shaft 34 to its open position shown in Fig. 4 and such movement will position recess 67 above lock bar 66 so that said lock bar 66 may be moved into locking engagement with shaft 34. Key 79 is then inserted through ring 83 and recess 84 and lock 73 is moved a sufficient distance so that cam 74 will depress lever 75 so that bar 69 is moved about its pivot 70 to withdraw locking bar 64 from locking engagement with shaft 45 and force locking bar 66 into locking engagement with shaft 34. The lock 73 is of such construction that the key 79 and key proper 81 cannot be withdrawn except when the lock has been turned to the position when the key was originally inserted therein and, therefore, it will be necessary for the operator to hold the lock in the previously described operated position until cover 22 has been moved upwardly a sufficient distance that the recess 65 in shaft 45 will be moved away from lock bar 64 a sufficient distance so that upon release of said locking means the action of spring 71 will force lock bar 64 against the periphery of shaft 45 and thereby prevent said lock bar from reentering recess 65. It will be seen that the relative diameter of the orifice $a$ in ring 83 and the diameter of shank 80 of key 79 are such that this raising of cover 22 may be accomplished to remove recess 65 from bar 64, but as the key 79 extends through ring 83 the key must be withdrawn before cover 22 can be further moved in an opening direction and upon such removal cover 22 may then be fully opened to the position shown in Fig. 4 so as to completely uncover the filling inlet 21. In fact, due to the ratchet mechanism the cover 22 must be moved to the fully opened position shown in Fig. 4 before such cover may again be closed and I thereby insure actuation of the recording mechanism 60.

After cover 22 has been moved to full open position the ratchet elements have been reversed and cover 22 may then be moved to its fully closed position at which time recess 65 will be positioned to receive lock bar 64 and such bar is automatically moved therein by spring 71 to lock cover 22 and such movement through bar 69 retracts lock bar 66 from recess 67 so that cover 31 may then be closed.

I have also provided automatic means for sealing lock 73 from accessibility through orifice 84 until a record of such accessibility has been made and such means comprises a thin metal tape or ribbon 85 that is unwound from a supply reel or spool 86ª over sprocket wheels 87 and 88 onto a take-up reel 89. Tape 85 passes over the keyway 86 in lock 73 and over a die plate 90 and stripper 91 that is mounted directly above lock 73, and die plate 90 is provided with a recess 92 through which key 79 may be passed.

Sprocket wheel 88 is mounted on shaft 93 and a gear 94 is also mounted on shaft 93 adjacent sprocket wheel 88 and is connected thereto by ratchet means including a spring operated plunger 95 that engages in a beveled recess 96 formed in the face of gear 94. There are three of such recesses 96 preferably formed in the face of gear 94 so that plunger 95 will be sure to engage a recess so as to insure that the tape 85 will be moved the requisite distance to effectuate a complete seal of lock 73 even after operation of opening and closing inner cover 22. A plurality of springs 97 are provided to engage the teeth of sprocket wheel 88 to prevent reverse movement of the tape 85 after the same has been moved past the entrance to lock 73 and as the cover 22 is being closed.

Gear 94 is connected by a train of gears 98 to shaft 45 so that operation of shaft 45 when cover 22 is being opened will operate sprocket wheel 88 and a belt 99 trained over a pulley 100 formed on sprocket wheel 88 and a pulley 101 formed on take-up reel 89 will operate take-up reel 89 to wind the tape 85 on take-up reel 89.

In Figs. 7 and 8 I have shown a detachable punch 102 for association with the die plate 90 and stripper 91 so that an opening may be punched in the metal tape 85 so as to expose the recess 92 in die plate 90 so that the key 79 may be inserted in lock 73. Such punch is provided with a threaded portion 103 that is adapted to be threaded into a threaded opening 104 in boss 85 and the punch 102 is provided with a cutting member 105 about which the outer sleeve 106 of punch 102 is rotatably mounted and the cutting member 105 is provided with a projecting pin 107 that is received in guideway 108 formed in the inside of opening 84 so as to prevent rotation of the cutting member 105 as the sleeve 106 is threaded downwardly in threaded opening 104 by rotation of the handle members 109. It will be seen that by further threading of the punch 102 through opening 104 from the position shown in Fig. 7 that the cutting tool 105 will force the stripper 91 downwardly over die 90 so that a token 110 (see Fig. 10) will be cut or punched out of tape 85 leaving a recess 111 (see Fig. 8) in tape 85 and over the orifice 92 so that the key 81 may be inserted in the keyway 86 in lock 73. The token 110 will remain in the cutting tool 105 and after removal of the punch 102 the rod 112 is depressed against spring 113 so as to force the token out of the cutting tool. A guard 114 is provided around the upper end of rod 112 so as to prevent accidental disengagement of token 110 from cutting tool 105 to thereby aid in insuring that the token will be removed with the cutting tool.

Means are provided to automatically prevent operation of lock 73 when the tape 85 is exhausted and such means comprises a gravity operated latch 115 that is provided with a slot 116 through which tape 85 passes and by which tape said latch 115 is held in inoperative position. Latch 115 is held in position by means of the screw 117 that passes through slot 118 and by means of the bend formed in said latch and its association with the die plate 90. The lower end of latch 115 is provided with an extension 119 which, when the tape 85 is exhausted, will drop in front of cam 74 and thereby prevent operation of lock 73 until the tape has been replenished. The latch portion of extension 119 and movement of latch 115 are shown by dot and dash lines in Fig. 7.

From the foregoing it will be seen that before cover 22 may be opened the seal in the form of the imperforate tape 85 extending across the recess 92 that permits access to lock 73 will have to be first perforated by means of the cutting tool 102 after which the key 79 may be inserted to operate lock 73 to release the locking mechanism of cover 22 and upon opening of cover 22 the operation of shaft 45 will operate the train of gears 98 and 94, and the recesses 96 formed in the face of gear 94 are such that during opening operation of cover 22 the ratchet connection with sprocket wheel 88 will operatively connect gear 94 with sprocket wheel 88. However, as before stated the key 79 must be removed from lock 73 before cover 22 may be further opened and upon such further opening of cover 22 sprocket wheel 88 will be moved a sufficient distance by reason of the gear ratio between the train of gears 98 and 94 so that tape 85 will be drawn across orifice 92 a sufficient distance to effectively close such orifice so as to prevent tampering with the lock when the cover 22 is opened. During closing operation of cover 22 the ratchet connection with sprocket wheel 88 will not operatively connect gear 94 with sprocket wheel 88 and springs 97 will prevent reverse movement of tape 85 to thereby eliminate likelihood of uncovering orifice 92 during closing operation of cover 22, which will be effectively closed until the seal thus formed by movement of tape 85 thereacross has again been broken by the removal of a token therefrom.

Advantages of this invention are that the compartment 3 in which lock 73 and its associated sealing mechanism are mounted may be closed by means of the sealed lock 7 so that access thereto may be had only by an authorized individual such as a person from the accounting department of a liquid dispensing company, thereby enabling such official to ascertain by the perforations in tape 85 that the number of perforations therein correspond with the number of times cover 22 has been opened as illustrated from a reading and computation of the indicator mechanism 60 and also that the driver for the dispensing company has returned to the company the number of tokens corresponding to the number of perforations in tape 85 and such tokens may have suitable indicia *b* formed thereon either by suitable mechanism associated with the die and cutting tool or by being originally stamped upon the tape 85 to thereby afford means for the accounting department to keep the tokens segregated and filed in accordance with the register from which they were taken.

By a reading and suitable check of the flow meter 30 the accounting department may determine whether or not the authorized distributing company has delivered to the container associated with the register for liquids the number of gallons of liquid represented as being delivered thereto by the person making the delivery.

It is apparent that the tape 85 may be marked in a suitable manner as by knurling or with a suitable color at the last end thereof delivered to die 90 so that a token delivered to the accounting department by the driver will indicate that the particular register for liquids from which such token was obtained will soon require a replenishment of tape 85 in compartment 2 so that the cover 22 will not be locked by latch 115 and thereby prevent delivery of liquid through the register.

I claim:

1. A closure device comprising a head having an inlet passage, a cover for said passage, locking mechanism for said cover, a seal protecting said locking mechanism, and means actuated by the cover movement for renewing said seal.

2. A closure device comprising a head having an inlet passage, a cover for said passage, locking mechanism for said cover, a seal for said locking mechanism, and means operable by said cover to shift said seal to a new sealing position at each operation of said cover.

3. A closure device comprising a head having an inlet passage, an outer cover for said passage, an inner cover for said passage, a lock for said inner cover, mechanism operated by said lock when said outer cover is fully opened to lock said outer cover in opened position, unlock said inner cover, and maintain said outer cover locked in open position while said inner cover is opened.

4. A closure device comprising a head having an inlet passage, an outer cover for said passage, an inner cover for said passage, mechanism for locking the outer cover in open position and unlocking the inner cover, and a ratchet element governing movement of said inner cover, said element requiring said inner cover to be completely opened or closed before starting a reverse movement of said inner cover.

5. A closure device comprising a head, an inlet passage in said head, an outer cover for said passage, an inner cover for said inlet passage; a register actuated by said inner cover to register each opening operation of said inner cover, and a ratchet element governing movement of said inner cover to control the opening and closing movements of said inner cover to cause said inner cover to be fully opened or completely closed before it can be moved in the opposite direction and to assure that the proper actuation of the said register will be made by the said inner cover for registration purposes.

6. A closure device comprising a head having an inlet passage, an outer cover for said passage, an inner cover for said passage, a lock having a seal zone and locking mechanism for both said covers, seal means for said lock comprising a length of seal tape, means operated by a predetermined movement of the inner cover for shifting a portion of said tape across the seal zone, the portion of said seal tape opposite said zone forming a seal over said lock, said portion being adapted to be cut from said seal tape by a tool for the purpose of providing access to the said lock for unlocking purposes, and to provide in the cut out seal a record of the operation.

7. In a liquid storage and dispensing system, the combination of: a tank having receiving and dispensing openings; means connected to said receiving opening and exclusively adapted for permitting the passage of liquid for filling said tank; means connected to said dispensing opening and exclusively adapted for dispensing liquid from said tank; closure means for said receiving opening; shut-off means for said dispensing opening; and means causing said shut-off means to be closed before said closure means can be opened.

8. In a liquid storage and dispensing system, the combination of: a tank having receiving and dispensing openings; means connected to said receiving opening and exclusively adapted for permitting the passage of liquid for filling said tank; means connected to said dispensing opening and exclusively adapted for dispensing liquid from said tank; closure means for said receiving opening; shut-off means for said dispensing opening; and means causing said shut-off means to be closed before said closure means can be opened and operative to open said shut-off means after said closure means has been closed.

9. In a liquid storage and dispensing system, the combination of: a tank having receiving and dispensing openings; means connected to said receiving opening and exclusively adapted for permitting the passage of liquid for filling said tank; means connected to said dispensing opening and exclusively adapted for dispensing liquid from said tank; closure means for said receiving opening; shut-off means for said dispensing opening; means causing said shut-off means to be closed before said closure means can be opened; and counting means for registering the number of times said closure means is opened.

10. In a liquid storage and dispensing system, the combination of: a tank having receiving and dispensing openings; means connected to said receiving opening and exclusively adapted for permitting the passage of liquid for filling said tank; means connected to said dispensing opening and exclusively adapted for dispensing liquid from said tank; closure means for said receiving opening; shut-off means for said dispensing opening; means causing said shut-off means to be closed before said closure means can be opened; counting means for registering the number of times said closure means is opened; and means requiring said closure means to be fully opened before said closure means can again be closed and in this manner assuring operation of said counting means.

11. In a liquid storage and dispensing system, the combination of: a tank having receiving and dispensing openings; means connected to said receiving opening and exclusively adapted for permitting the passage of liquid for filling said tank; means connected to said dispensing opening and exclusively adapted for dispensing liquid from said tank; closure means for said receiving opening; shut-off means for said dispensing opening; means causing said shut-off means to be closed before said closure means can be opened; key lock means for said closure means; a record seal for said lock means; and means for positioning a fresh portion of said seal opposite said lock means for each cycle of operation said closure means is operated.

12. In a liquid storage and dispensing system, the combination of: a tank having receiving and dispensing openings; means connected to said receiving opening and exclusively adapted for permitting the passage of liquid for filling said tank; means connected to said dispensing opening and exclusively adapted for dispensing liquid from said tank; closure means for said receiving opening; shut-off means for said dispensing opening; means causing said shut-off means to be closed before said closure means can be opened; key lock means for said closure means; a record seal for said lock means; means for positioning a fresh portion of said seal opposite said lock means for each cycle of operation said closure means is operated; and means requiring said closure means to be fully opened before said closure means can again be closed and in this manner assuring uniform operation of said seal positioning means.

13. In a liquid storage and dispensing system, the combination of: a tank having receiving and dispensing openings; means connected to said receiving opening and exclusively adapted for permitting the passage of liquid for filling said tank; means connected to said dispensing opening and exclusively adapted for dispensing liquid from said tank; closure means for said receiving opening; shut-off means for said dispensing opening; means causing said shut-off means to be closed before said closure means can be opened; key lock means for said closure means; a record seal for said lock means; means for positioning a fresh portion of said seal opposite said lock means for each cycle of operation said closure means is operated; and means to facilitate removing a portion of said seal as a token of each unlocking operation.

14. In a liquid storage and dispensing system, the combination of: a tank having receiving and dispensing openings; means connected to said receiving opening and exclusively adapted for permitting the passage of liquid for filling said tank; means connected to said dispensing opening and exclusively adapted for dispensing liquid from said tank; closure means for said receiving opening; shut-off means for said dispensing opening; means causing said shut-off means to be closed before said closure means can be opened; key lock means for said closure means; a record seal for said lock means; means for positioning a fresh portion of said seal opposite said lock means for each cycle of operation said closure means is operated; and means preventing said seal positioning means from being actuated until the key for unlocking said lock is removed therefrom.

15. In a liquid storage and dispensing system, the combination of: a tank having receiving and dispensing openings; means connected to said receiving opening and exclusively adapted for permitting the passage of liquid for filling said tank; means connected to said dispensing opening and exclusively adapted for dispensing liquid from said tank; closure means for said receiving opening; shut-off means for said dispensing opening; means causing said shut-off means to be closed before said closure means can be opened; key lock means for said closure means; a progressing record seal for said lock means; means actuated by movement of said closure to cause said seal to progress after said lock means has been unlocked; and means preventing said seal progressing means from being actuated until the key for said lock has been removed therefrom.

16. In a liquid storage and dispensing system, the combination of: a tank having receiving and dispensing openings; means connected to said receiving opening and exclusively adapted for permitting the passage of liquid for filling said tank; means connected to said dispensing opening and exclusively adapted for dispensing liquid from said tank; closure means for said receiving opening; shut-off means for said dispensing opening; means causing said shut-off means to be closed before said closure means can be opened; key lock means for said closure means; a record seal tape for said key lock means; and means for progressively shifting said tape relative to said lock means to present a predetermined portion of said tape in position to act as a seal following each cycle of operation of said closure means.

17. In a liquid storage and dispensing system, the combination of: a tank having receiving and dispensing openings; means connected to said receiving opening and exclusively adapted for permitting the passage of liquid for filling said tank; means connected to said dispensing opening and exclusively adapted for dispensing liquid from said tank; closure means for said receiving opening; shut-off means for said dispensing opening; means causing said shut-off means to be closed before said closure means can be opened; key lock means for said closure means; a record seal tape for said key lock means; means for progressively shifting said tape relative to said lock means to present a predetermined portion of said tape in position to act as a seal following each cycle of operation of said closure means; and means to facilitate removing a portion of said seal tape as a token of each unlocking operation.

18. The combination with a storage tank for liquids having an inlet pipe and outlet pipe, and means connecting said outlet pipe to a dispensing means; of a cover for covering said inlet pipe; and means operable by said cover whereby said outlet pipe is closed when said cover is removed to permit liquid to be delivered through said inlet pipe into said storage tank.

19. The combination with a plurality of storage tanks, each provided with an outlet pipe, said pipes being connected to a common dispensing means; and an intake pipe to each of said tanks; closure means for each of said intake pipes; and means associated with each closure means and operable by its associated closure means to close the outlet pipe from its associated tank when said closure means is opened to expose the inlet to the intake pipe of said particular tank.

20. A combination with a storage tank for liquids having an outlet through which liquid is dispensed from said tank; and an inlet for said tank; of a valve in said outlet; a hinged cover member adapted to close said inlet; means connected to said hinged cover member and said valve and operable by opening and closing said hinged cover member to close and open said valve whereby said valve is closed when said cover member is removed from said inlet and said valve is opened when said cover member covers said inlet.

21. The combination with an inlet to a storage tank; of closure means for said inlet; indicating mechanism; means connected to said closure means to operate said indicating mechanism to indicate each time said closure means is removed; lock means controlling said closure means; and a seal for said lock adapted to have a portion removed to give access to said lock and by which removal of said portion a record is shown by the remaining portion of said seal whereby said record and indicating mechanism may be checked.

22. The combination with an inlet for storage tanks; of a register for liquids associated with said inlet, said register comprising means to indicate the quantity of liquid delivered to said inlet; a cover for said inlet; means associated with said cover to indicate the number of times said inlet is exposed; lock means controlling operation of said cover; seal means for said lock means comprising a perforatable tape adapted to have a portion thereof, over said lock, removed; and means associated with said cover adapted when said cover is moved from closed to open position to move said tape to prevent access to said lock.

23. The combination with an inlet for storage tanks; of a register for liquids associated with said inlet, said register comprising means to indicate the quantity of liquid delivered to said inlet; a cover for said inlet; means associated with said cover to indicate the number of times said inlet is exposed; lock means controlling operation of said cover; seal means to prevent access to said lock means comprising a perforatable tape adapted to have a portion thereof, over said lock, removed; means associated with said cover adapted when said cover is moved from closed to open position to move said tape to prevent access to said lock; and means associated with said cover to permit operation of said cover in one direction only, until said cover has been moved to its limit of direction in open or closed position.

24. The combination with an inlet for storage tanks; of a register for liquids associated with said inlet, said register comprising means to indicate the quantity of liquid delivered to said inlet; a cover for said inlet; means associated with said cover to indicate the number of times said inlet is exposed; lock means controlling operation of said cover; seal means for said lock means comprising a perforatable tape adapted to have a portion thereof, over said lock, removed; means associated with said cover adapted to move said tape over said lock when said cover is moved from closed to open position; and means to automatically prevent operation of said lock means when the supply of said perforatable tape is exhausted.

25. The combination with an inlet for storage tanks; of a cover for said inlet; a shaft to which said cover is fixed; lock means controlling operation of said cover; seal means to prevent access to said lock means comprising a perforatable tape adapted to have a portion thereof, over said lock, removed; supporting members to support said tape to permit the latter to prevent access to said lock; and means connecting said shaft with one of said supporting members for said tape whereby when said cover is opened said tape is moved to prevent access to said lock and whereby movement of said tape is not affected by moving said cover to closed position.

26. The combination with an inlet for storage tanks; of a housing for said inlet; a cover for said inlet; a cover for said housing adapted to prevent access to said cover for said inlet when said housing cover is closed; lock means for both of said covers; a key controlled operating means for said lock means; said lock means being operable by said key controlled means to release said inlet cover and to lock said housing cover; and means whereby operation of said lock means is prevented until said housing cover is fully opened.

27. The combination with an inlet for storage tanks; of a housing for said inlet; a cover for said inlet; a cover for said housing adapted to prevent access to said cover for said inlet when said housing cover is closed; lock means for both of said covers; a key controlled operating means for said lock means; said lock means being operable by said key controlled means to release said inlet cover and to lock said housing cover; means preventing operation of said lock means until said housing cover is fully opened; and means associated with said locking means to automatically operate said locking means to lock said inlet cover and unlock said housing cover when said inlet cover is moved to closed position.

28. The combination with an inlet for storage tanks; of a cover for said inlet; lock means for said cover; key controlled means for said lock means; a roll of perforatable tape adapted to prevent access to said key controlled means and to have a portion removed therefrom to permit access to said key controlled means; and latch means normally held out of operative position by said tape, said latch means automatically preventing operation of said key controlled means when said roll of tape is exhausted.

29. The combination with an inlet for storage tanks for liquids; of a cover for said inlet, means indicating the quantity of liquid delivered to said tank; means to indicate the number of times said inlet has been exposed to admit liquid thereto; a second cover adapted to enclose said first mentioned cover and each of said indicators; and key controlled locking means adapted to permit operation of said inlet cover after said second cover is moved to a predetermined open position.

30. In combination: a casing; a compartment within said casing; spools rotatably mounted in said compartment; a perforatable tape adapted to be unwound from one of said spools and wound up on another of said spools; a lock mounted in said compartment adjacent said tape, said tape being adapted to prevent access to said lock and to have a portion removed therefrom to permit access to said lock; and means to move an imperforate portion of said tape over said lock.

31. In combination: a casing; a compartment within said casing; key controlled means including a lock mounted in said compartment; a perforatable tape adapted to be moved over said lock to prevent access to said lock and to have a portion removed therefrom to permit access to said lock; and means to automatically prevent operation of said lock controlled means when said tape is exhausted.

32. In combination: a conduit having an inlet; a closure for said conduit inlet; indicating mechanism; means connected to said closure to operate said indicating mechanism to indicate each time said closure is removed to expose said conduit inlet; lock means controlling said closure; and means associated with said closure to permit operation of said closure in one direction only until said closure has been moved to its limit of direction in open or closed position.

33. In combination: a conduit having an inlet; a closure for said conduit inlet; indicating mechanism; means connected to said closure to operate said indicating mechanism to indicate each time said closure is removed to expose said conduit inlet; lock means controlling said closure; and means associated with said closure and permitting operation of said closure to open position after release of said lock means but preventing said closure to be returned to closed position until after its having been moved to its limit of direction in opened position.

34. In combination: a conduit having an inlet; a closure for said conduit inlet; lock means controlling said closure; means associated with said closure to permit operation of said closure in one direction only until said closure has been moved to its limit of direction in open or closed position; indicating mechanism; and means associated with said closure to operate said indicating mechanism to indicate each time said closure is removed to expose said conduit inlet.

35. In combination: locking means; a seal adapted to perform a plurality of sealing operations; means to support a portion of said seal in such sealing relation with said locking means as to require mutilation of said portion to permit said locking means to be unlocked; and means for causing a progressive movement of said seal during intervals between successive unlockings of said locking means to present a fresh portion of said seal in sealing relation with said locking means.

36. A combination as in claim 35 in which said seal is a piece of tape, and the mutilated portions thereof are adapted to serve as a record of said unlockings.

37. A combination as in claim 35 in which means is provided for protecting all portions of said seal excepting the portion currently disposed in sealing relation with said locking means, the mutilated portions of said seal serving as a record of said unlockings.

38. In combination: locking means; a seal adapted to perform a plurality of sealing operations; means to support a portion of said seal in such sealing relation with said locking means as to require mutilation of said portion to permit said locking means to be unlocked; means for causing a progressive movement of said seal during intervals between successive unlockings of said locking means to present a fresh portion of said seal in sealing relation with said locking means, and shift a mutilated portion of said seal into an unexposed position.

RALPH G. WHITLOCK.